June 11, 1963 R. H. WESLEY ETAL 3,093,770
HIGH ENERGY SPARK CONTROL
Filed Jan. 8, 1960 2 Sheets-Sheet 1
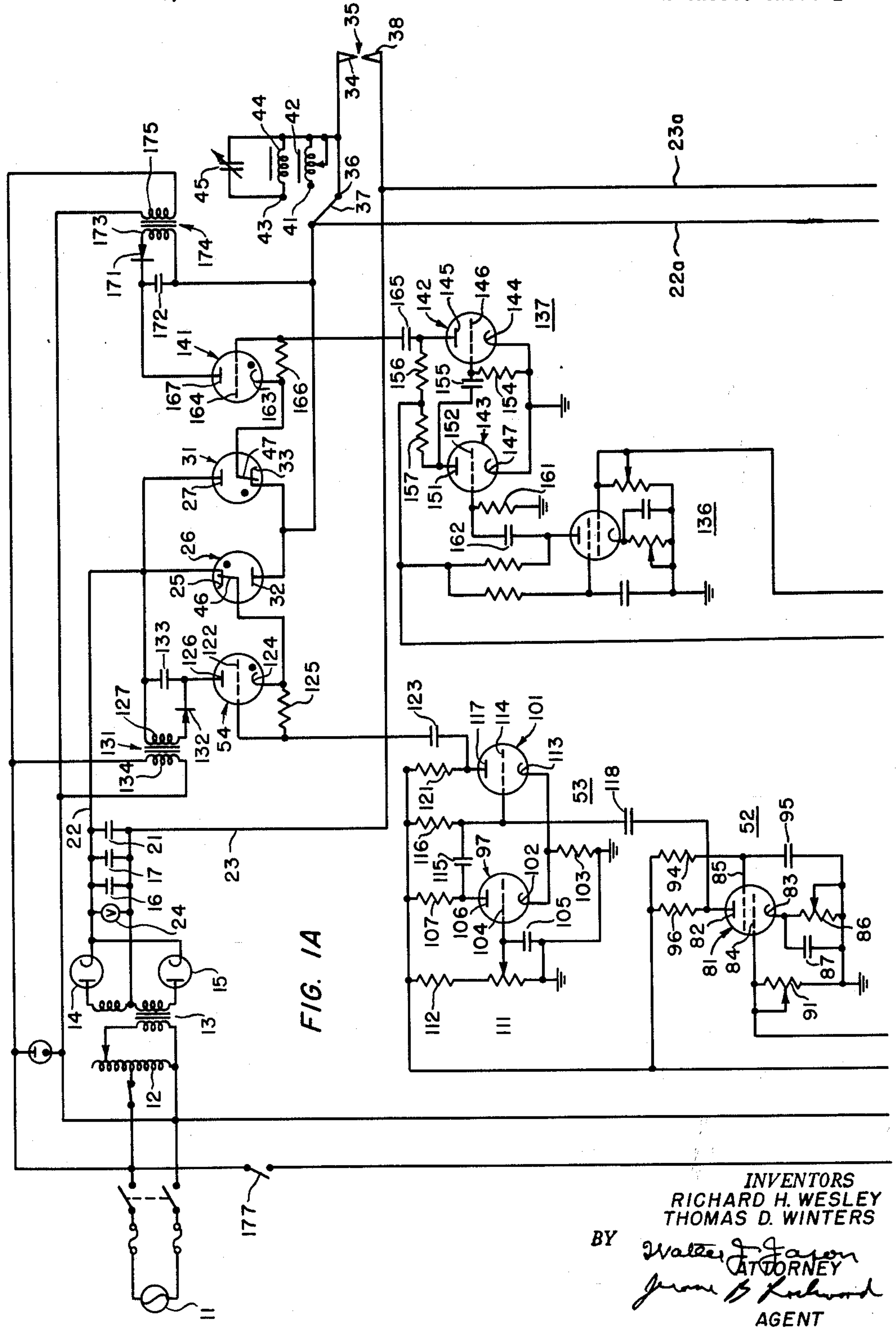

HIGH ENERGY SPARK CONTROL
Filed Jan. 8, 1960 2 Sheets-Sheet 2
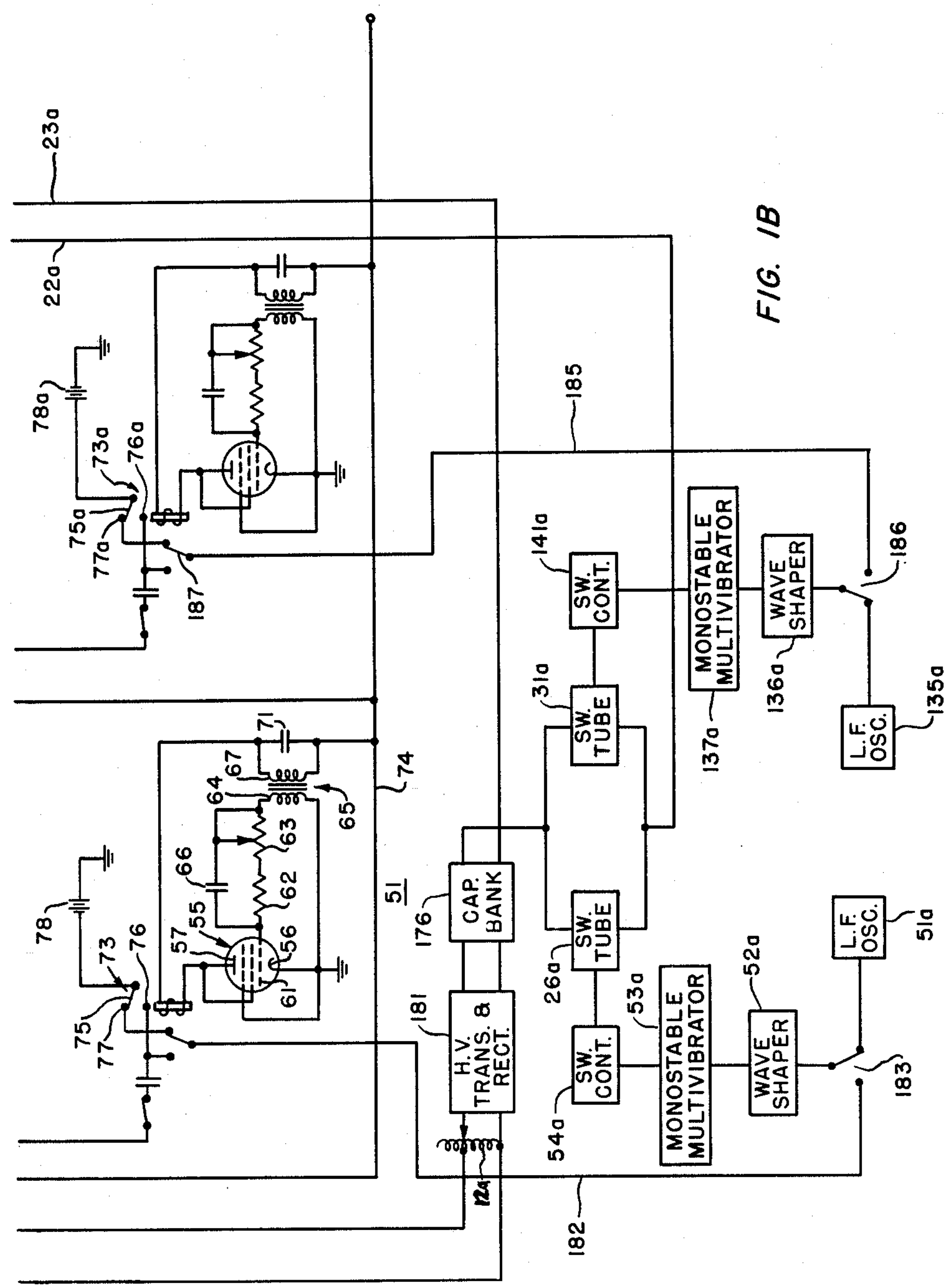
INVENTORS
RICHARD H. WESLEY
THOMAS D. WINTERS
BY Walter J. Jason
ATTORNEY
Jerome B. Rockwood
AGENT United States Patent Office 3,093,770 Patented June 11, 1963

3,093,770

HIGH ENERGY SPARK CONTROL

Richard H. Wesley, Fort Worth, and Thomas D. Winters, Irving, Tex., assignors to General Dynamics Corporation (Convair Division), San Diego, Calif., a corporation of Delaware Filed Jan. 8, 1960, Ser. No. 1,245
16 Claims. (Cl. 315—241)

This invention relates to spark discharge apparatus, and more particularly to means for controlling the shape, amplitude, duration and frequency of spark discharge energy.

An electric spark passed between a pair of electrodes immersed in a suitable fluid medium transforms electrical energy into heat, mechanical pressure and shock energy, which may be advantageously employed in place of chemical explosives in metal forming and blanking, geophysical exploration, well logging and many other applications. Chemical explosives, such as nitroglycerin or trinitrotoluene, do not enable accurate control of energy output, nor of the shape of the amplitude envelope of the shock wave emitted by the explosion. Further, chemical explosives are dangerous to store and use.

Accurate control of energy output may be readily obtained in a spark discharge. Heretofore, however, it has not been possible to accurately control the duration, amplitude, or envelope shape of the discharged energy. The present invention enables accurate control over the amplitude and duration of the energy output of a spark discharge. The shape of the energy envelope may be controlled and varied. The time between, and the polarity of individual discharges may be controlled readily.

The present invention includes a high voltage rectifier connected to charge a bank of capacitors. A second rectifier and capacitor bank may be provided. Control switches are provided whereby each bank may be discharged across a spark gap individually, alternately, or simultaneously with the other bank. Duration of the discharge, time of initiation of discharge, and relative polarity of discharge are regulated by means of oscillators connected to control electronic switches. Wave shape of the discharge may be additionally controlled by inserting such passive reactance elements as inductors and capacitors in circuit with the spark gap.

It is an object of the present invention, therefore, to provide means for generating and controlling a high energy spark discharge.

Another object of this invention is to provide means for controlling the intensity, duration and frequency of high energy spark discharges.

Another object of this invention is to provide means for controlling the shape of the energy envelope of a high energy spark discharge.

Another object of this invention is to provide means for producing a controlled series of spark discharges.

Another object of this invention is to provide high energy spark discharge control apparatus which is simple, safe, compact, and inexpensive to build and operate.

These and other objects and advantages of the present invention will be more apparent to one skilled in the art upon study of the following specification and appended drawing, wherein FIGS. 1A and 1B illustrate a schematic diagram of a presently preferred embodiment of the invention.

A suitable A.C. power source 11 is connected to a variable autotransformer 12. The tap side of autotransformer 12 is connected to the primary winding of a voltage step-up transformer 13. A conventional full wave high voltage rectifier including rectifier diodes 14 and 15 is connected to the secondary winding of transformer 13.

A bank of capacitors, exemplarily 16, 17 and 21, are connected across the high voltage rectifier by means of high voltage busses 22 and 23, and is adapted to be charged thereby. A voltmeter 24 is also connected across the high voltage rectifier in parallel with the capacitor bank.

As is readily apparent to one skilled in the art, high voltage buss 22 carries a positive polarity voltage, and high voltage buss 23 carries a negative polarity voltage in the charged, quiescent condition. Positive polarity buss 22 is connected to cathode 25 of a first ignitron switching tube 26 and anode 27 of a second ignitron switching tube 31. Anode 32 of ignitron 26 and cathode 33 of ignitron 31 are connected to electrode 34 of spark gap 35 through contact 36 and moveable contact 37 of a three position switch. Electrode 38 of spark gap 35 is connected to high voltage buss 23. Alternatively, contact 41 of switch 37 enables connection of variable inductance 42 in circuit, and contact 43 enables connection of the parallel combination of variable inductor 44 and variable capacitor 45 in circuit with ignitrons 26 and 31.

Ignitron 26 is furnished with ignition electrode 46, and ignitron 27 is furnished with ignition electrode 47. Polarity and amplitude of the potentials applied to ignition electrodes 46 and 47 control the current flow through the ignitrons 26 and 31. Control potentials for ignitron 26 are furnisheod by a low frequency oscillator 51, wave shaper 52, monostable multivibrator 53, and thyratron 54.

Low frequency oscillator 51 includes a vacuum tube 55 including a cathode 36, an anode 57, and a control electrode 61. A series circuit comprising fixed resistor 62, potentiometer 63, and primary winding 64 of transformer 65 is connected between control electrode 61 and cathode 56. A capacitor 66 is connected between the moveable arm of potentiometer 63 and control electrode 61. Secondary winding 67 of transformer 65, in parallel with a capacitor 71, is connected at one end to anode 57 of tube 55 through coil 72 of chopper relay 73, and at the other end to a suitable source of positive anode potential, not shown, through anode potential supply buss 74. Chopper relay 73 is furnished with a moveable contact 75 connected to a source of negative potential 78 at, exemplarily, 50 volts, a normally open contact 76 and a normally closed contact 77.

A wave shaping circuit 52 includes a tetrode vacuum tube 81 operated as an overdriven amplifier. Tube 81 has an anode 82, cathode 83, control electrode 84 and screen electrode 85. Cathode 83 is connected to ground through variable biasing resistors 86 and bypass capacitor 87. Control electrode 84 is connected to ground through potentiometer 91. The moveable arm of potentiometer 91 is connected to fixed contact 76 of relay 73 through blocking capacitor 92 and single pole, single throw switch 93. Screen electrode 85 is connected to anode supply buss 74 through screen dropping resistor 94, and to ground through bypass capacitor 95. Anode 82 is connected to anode supply buss 74 through resistor 96.

Monostable multivibrator 53 includes two triode vacuum tubes, 97 and 101. Triode vacuum tube 97 includes a cathode electrode 102 connected to ground through a resistor 103, a control electrode 104 connected to ground through the moveable arm of potentiometer 111 and a capacitor 105, in parallel, and an anode 106 connected to anode potential supply buss 74 through resistor 107. Potentiometer 111 has one end connected to ground and the other to anode potential buss 74 through resistor 112. Triode 101 includes an anode 113 also connected to ground through resistor 103, a control electrode 114 connected to anode 106 of triode 97 through coupling capacitor 115, to anode potential supply buss 74 through resistor 116, and to anode 82 of tube 81 through coupling capacitor 118, and an anode 117, connected to anode supply buss 74 through anode resistor 121.

Thyratron 54 includes a control electrode 122 connected to anode 117 of triode 101 through coupling capacitor 123, a cathode 124 connected to coupling capacitor 123 and control electrode 122 through resistor 125, and an anode 126. Anode 126 is connected to a series circuit including secondary winding 127 of transformer 131, rectifier diode 132 and capacitor 133, between diode 132 and capacitor 133. Primary winding 134 is connected to A.C. power source 11. Cathode 25 of ignitron 26 is connected between capacitor 133 and secondary winding 127, and ignition electrode 46 is connected to cathode 124 of thyratron 54.

Control potentials for ignitron 31 are provided by low frequency oscillator 135, wave shaper 136, monostable multivibrator 137, and thyratron 141. Low frequency oscillator 135 is substantially similar to low frequency oscillator 51, disclosed in detail hereinabove. However, moveable contact **75*a* of relay 73*a* is connected to a source of positive potential 78*a* instead of negative potential source 78. Wave shaper 136 is substantially identical to wave shaper 52. Monostable multivibrator 137 differs from monostable multivibrator 53. Monostable multivibrator 137 includes a first triode 142 and a second triode 143. Triode 142 includes cathode 144, anode 145, and control electrode 146, and triode 143 includes cathode 147, anode 151 and control electrode 152. Cathode 144 and cathode 147 are connected to ground through common cathode resistor 153. Control electrode 146 is connected to cathode 144 through resistor 154, and to anode 151 through capacitor 155. Anode 145 is connected to anode potential supply buss 74 through resistor 156. Anode 151 is similarly connected to anode supply buss 74 through resistor 157. Control electrode 152 is connected to ground through resistor 161, and to the output of wave shaper 136 through coupling capacitor 162**.

Thyratron 141 is connected in circuit in a manner similar to thyratron 54. Cathode 163 is connected to ignition electrode 47 of ignitron 31, and control electrode 164 is connected to anode 145 of triode 142 through coupling capacitor 165, and to cathode 163 through resistor 166. Anode 167 is connected to the junction of diode 171 and capacitor 172. Diode 171 and capacitor 172 are serially connected to secondary winding 173 of transformer 174. Primary winding 175 is connected to A.C. power source 11.

A second capacitor bank 176, and associated charging and discharge control circuits enables a series of high energy spark discharges to be produced across spark gap 35 in rapid succession, one capacitor bank charging while the other is discharging. The charging circuit for capacitor bank 176 includes a variable autotransformer **12*a* connected to power source 11 through switch 177 and a high voltage transformer and rectifier 181 connected to the tap side of autotransformer 12*a*. Capacitor bank 176 is discharged through ignitron switch tubes 26*a* and 31*a*, identical to ignitron switch tubes 26 and 36. Ignitron 26*a* is controlled by low frequency oscillator 51*a*, wave shaper 52*a*, monostable multivibrator 53*a*, and switch control thyratron 54*a*, substantially identical in circuitry to low frequency oscillator 51, wave shaper 52, monostable multivibrator 53 and thyratron 54, respectively. Similarly, ignitron 31*a* is controlled by low frequency oscillator 135*a*, wave shaper 136*a*, monostable multivibrator 137*a*, and thyratron 141*a*, substantially identical to low frequency oscillator 135, wave shaper 136, monostable multivibrator 137 and thyratron 141**, respectively.

Ignitron switch tube **26*a* may be synchronized with ignitron switch tube 26. A conductor 182 may be connected to wave shaper 52*a*, instead of low frequency oscillator 51*a*, by means of single pole, double throw switch 183. The other end of conductor 182 is connected to the moveable contact of single pole, double throw switch 184. Switch 184 enables ignitron 26*a* to be operated in phase with ignitron 26, or 180 degrees out of phase therewith. Similarly, conductor 185, connected between switch 186 and switch 187, enables synchronization of ignitron 31*a* with ignitron 31**, in phase or 180 degrees out of phase.

Alternating current power, conveniently at 110 volts, is applied to autotransformer 12, assuming switch 177 is open. Autotransformer 12 varies the voltage applied to the primary winding of transformer 13, wherein it is stepped up to the desired voltage by the secondary winding. The secondary winding is connected in a conventional full wave rectifier circuit with rectifiers 14 and 15, producing a high D.C. voltage across capacitors 16, 17 and 21, measured by voltmeter 24, charging the bank of capacitors 16, 17 and 21.

As disclosed hereinabove, discharge of the capacitors 16, 17 and 21 is controlled by a first control circuit including low frequency oscillator 51, wave shaper 52, monostable multivibrator 53, thyratron 54 and ignitron 26, and by a second control circuit including low frequency oscillator 135, wave shaper 136, monostable multivibrator 137, thyratron 141 and ignitron 31.

Low frequency oscillator 51 is substantially identical to low frequency oscillator 135. Application of anode potential causes anode current to flow in transformer winding 67, inducing a positive potential at the control electrode end of transformer winding 64, further increasing anode current. Upon reaching the saturation point of tube 55, a positive potential is no longer induced on transformer winding 64. Capacitor 66, charged to a positive potential, gradually discharges through resistors 63 and 62 while providing a declining positive potential to the control electrode 61. As the positive grid potential declines, anode current decreases, inducing a negative potential at the grid end of transformer winding 64, thereby further reducing anode current. Capacitor 71, charged by anode potential tends to maintain current flowing through transformer winding 67 in the direction inducing a negative potential at the grid end of transformer winding 64. Similarly, capacitor 66 becomes charged in a manner maintaining a negative potential on control electrode 61, discharging slowly through resistors 62 and 63. Upon removal of the negative potential from control electrode 61, space current through tube 55 increases, restarting the cycle. As will be apparent, frequency of oscillation may be varied over a broad range by varying potentiometer 63, in the discharge path of capacitor 66. Variation of potentiometer 63 enables operation of oscillator 51 at frequencies ranging from one-eighth cycle per second to several hundred cycles per second.

Coil 72 of relay 73 carries the anode current of tube 55. Thus moveable contact 75 of relay 73, connected to negative potential source 78, applied negative potential to fixed contact 76 during a period of high anode current in tube 55, and to fixed contact 77 during periods of cut-off and low anode current.

A negative going square wave is applied to control electrode 84 of tube 81 in wave shaper 52. Transients, such as spikes, ringing, etc., are removed from the square wave by wave shaper 52, operating as an overdriven amplifier. Input signal amplitude is adjusted by means of potentiometer 91, and tube bias, governing the positive and negative cut-off points, is adjusted by means of potentiometer 86.

The square wave from wave shaper 52 is coupled through capacitor 118 to control grid 114 of tube 101 in monostable multivibrator 53. In the quiescent condition tube 101 is normally conducting, while tube 97 is normally cut off. A negative-going pulse from wave shaper 52 drives normally conducting tube 101 to cut-off, causing a positive pulse to be applied to control electrode 122 of thyratron 54. Pulse duration is substantially that of the signal furnished by wave shaper 52, since upon removal of the negative wave shaper signal, tube 101 of monostable multivibrator 53 returns to the conducting condition, and tube 97 returns to the nonconducting condition. Pulse duration may be varied by adjusting potentiometer 111, biasing tube 97.

Capacitor 133, connected to anode 126 of thyratron 54 and to cathode 25 of ignitron 26, is charged by rectifier 132 and transformer 131, with positive polarity at thyratron anode 126. Application of the positive pulse from tube 101 of monostable multivibrator 53 to control electrode 122 of thyratron 54 causes thyratron 54 to conduct, effectively connecting charged capacitor 133 between ignitor electrode 46 and cathode 25 of ignitron 26. Capacitor 133 discharges through ignitor electrode 46 and cathode 25, raising the temperature of the mercury cathode of the ignitron sufficiently to enable ignitron 26 to conduct.

The second control circuit including low frequency oscillator 135, wave shaper 136, multivibrator 137, thyratron 141 and ignitron 31, for control of the discharge of capacitors 16, 17 and 21 is similar in operation to the operation of the first control circuit as disclosed hereinabove. Low frequency oscillator 135 is substantially similar in operation to low frequency oscillator 51, providing, however, a positive going square wave from positive voltage source 78*a* and relay 73*a*. Wave shaper 136, substantially similar in structure and function to wave shaper 52, applied the positive square wave to control electrode 152 of tube 143 in monostable multivibrator 137 through coupling capacitor 162. Tube 143 is biased to be normally non-conducting and tube 142 is biased to be normally conducting. The positive pulse applied to grid 152 causes tube 143 to conduct, and, through capacitor 155 and common cathode resistor 153, substantially simultaneously cuts off tube 142 in a manner well known to those skilled in the art.

Anode 145 of tube 142 is connected to control electrode 164 of thyratron 141 through coupling capacitor 165. As tube 142 cuts off, a positive polarity pulse is applied to thyratron 141 causing it to fire. Capacitor 172, charged by transformer 174 and rectifier 171, discharges through a circuit including thyratron 141, ignition electrode 47 and cathode 33 of ignitron 31 upon firing of thyratron 141. As disclosed hereinabove in connection with ignitron 26, discharge of capacitor 172 through ignitor electrode 47 and pool cathode 33 enables ignitron 31 to conduct.

It will be apparent from the foregoing that ignitrons 26 and 31 may be caused to conduct at substantially the same time. A circuit is then completed including capacitors 16, 17 and 21, conductor 22, ignitrons 26 and 31, switch arm 37 and contact 36, electrodes 34 and 38 of spark gap 35, and conductor 23. With switch arm 37 connected to contact 36, charged capacitors 16, 17 and 21 are connected directly to spark gap 35 upon ignition of ignitrons 26 and 31. Each spark discharge will, therefore, have an energy envelope in the form of a sine wave so highly damped as to be less than a half cycle long, with the same polarity at the electrodes as the charge on the capacitors. A rather broad unidirectional spark energy pulse is thus obtained. With switch arm 37 connected to contact 41, connecting variable inductance 42 in the discharge circuit, an alternating oscillatory discharge is obtained across spark gap 35. Frequency of the oscillatory discharge may be adjusted by varying the amount of inductance in the circuit. A sharply peaked, highly damped spark energy discharge is obtained with switch arm 37 connected to contact 43, placing the parallel circuit including inductance 44 and capacitor 45 in the discharge circuit.

Low frequency oscillators 51 and 135 are suitably synchronized in phase and frequency, thereby enabling ignitrons 26 and 31 to conduct substantially simultaneously. Both ignitrons must be conducting to enable an oscillatory discharge at spark gap 35. A unidirectional discharge, however, requires only ignitron 31 to be conducting. Therefore, when a unidirectional pulse is employed, only one low frequency oscillator, such as 135, need be employed to control the repetition rate of the spark energy discharges.

As will be apparent, the ultimate spark discharge repetition rate is limited by the rate that the capacitor bank can be charged by the high voltage transformer and rectifier. In order to protect the transformer, rectifier and power source, the internal impedance thereof is made high, limiting the discharge repetition rate by requiring a definite time to recharge the capacitors between discharges. Further, the quantity of energy which may be stored in the capacitor bank and discharged at one time is fixed by the capacity and charging voltage. Great flexibility and additional utility is provided by a second high voltage transformer and rectifier 181, capacitor bank 176, ignitron switch tubes 26*a* and 31*a*, and suitable control circuits.

Switch tube, or ignitron, 26*a* may be caused to conduct in synchronism with switch tube, or ignitron, 26 by connecting wave shaper 52*a* to fixed contact 76 of relay 73 by switch 184 in its right hand position, conductor 182 and switch 183 in its left hand position. Wave shaper 52*a*, monostable multivibrator 53*a*, switch control 54*a*, and switch tube 26*a*, substantially identical to wave shaper 52, monostable multivibrator 53, thyratron switch control circuit 54 and ignitron switch tube 26, respectively, connect capacitors 176 to spark gap 35 through conductors 22*a* and 23*a*. Similarly, switches 186 and 187 in the right hand positions enable wave shaper 136*a*, monostable multivibrator 137*a* and thyratron switch control 141*a* to cause ignitron 31*a* to conduit in synchronism with ignitron 31. It will be apparent, therefore, that both banks of capacitors are discharged through spark gap 35 simultaneously, doubling the discharge energy. On the other hand, switches 184 and 187 in their left hand positions, as illustrated doubles the repetition rate, causing ignitrons 26*a* and 31*a* to conduct and discharge capacitor bank 176 through spark gap 35 while the bank of capacitors 16, 17 and 21 are being charged. Switch 183 in its right hand position connects low frequency oscillator 51*a* to the control circuit associated with ignitron 26*a*. Similarly, switch 186 in its left hand position connects low frequency oscillator 135*a* to the control circuit associated with ignitron 31*a*. In this position, repetition rate of discharge of capacitor bank 176 is independent of the repetition rate of discharge of the capacitor bank made up of capacitors 16, 17 and 21. Such an arrangement may be useful, exemplarily, in situations where a relatively high energy discharge pulse is required to be alternated with a relatively low energy discharge pulse. Local oscillators 51*a* and 135*a* are adjusted to operate at a frequency double that of local oscillators 51 and 135, and in synchronism therewith. Therefore, both banks of capacitors are discharged simultaneously at the lower repetition rate determined by the lower oscillator frequency, and only capacitor bank 176 is discharged at times intermediate to the discharge of both capacitor banks.

While a presently preferred embodiment of this invention has been disclosed hereinabove, many modifications may be made therein by one skilled in the art without departing from the true scope and spirit of this invention as set forth in the appended claims.

What we claim is:

1. Spark discharge control apparatus comprising a capacitor, means for charging said capacitor, a spark gap, normally open electronic switch means in circuit between said capacitor and said spark gap, a spark discharge repetition rate control oscillator, spark discharge duration control means connected to said oscillator, and means to close said electronic switch means in response to said oscillator and said duration control means, thereby controlling the duration and repetition rate of discharge of said capacitor through said spark gap.

2. Spark discharge control apparatus comprising a capacitor, means for charging said capacitor, a spark gap, normally open electronic switch means in circuit between said capacitor and said spark gap, a spark discharge repetition rate control oscillator, a wave shaper connected to said oscillator, spark discharge duration control means connected to said wave shaper, and means to close said electronic switch means in response to said oscillator and said duration control means, thereby controlling the duration and repetition rate of discharge of said capacitor through said spark gap.

3. Spark discharge control apparatus comprising a capacitor, means for charging said capacitor, a spark gap, normlly open electronic switch means in circuit between said capacitor and said spark gap, a spark discharge repetition rate control oscillator, spark discharge duration control means connected to said oscillator, and means to close said electronic switch means in response to said oscillator and said duration control means, thereby controlling the duration and repetition rate of discharge of said capacitor through said spark gap, and means for connecting a reactance in circuit with said spark gap for controlling the wave envelope of said spark discharge.

4. Spark discharge control apparatus comprising a capacitor, means for charging said capacitor, a spark gap, normally open electronic switch means in circuit between said capacitor and said spark gap, a spark discharge repetition rate control oscillator, a wave shaper connected to said oscillator, spark discharge duration control means connected to said wave shaper, and means to close said electronic switch means in response to said oscillator and said duration control means, thereby controlling the duration and repetition rate of discharge of said capacitor through said spark gap, and means for connecting a reactance in circuit with said spark gap for controlling the wave envelope of said spark discharge.

5. Spark discharge control apparatus comprising a capacitor, means for charging said capacitor, a spark gap, normlly open electronic switch means in circuit between said capacitor and said spark gap, a spark discharge repetition rate control oscillator, relaxation oscillator spark discharge duration control means connected to said repetition rate control oscillator, and means to close said electronic switch means in response to said repetition rate control oscillator and said relaxation oscillator, thereby controlling the duration and repetition rate of discharge of said capacitor through said spark gap.

6. Spark discharge control apparatus comprising a capacitor, means for charging said capacitor, a spark gap, a first normlly open unidirectional electronic switch conducting in a first direction and a second normally open unidirectional electronic switch conducting in a second direction in circuit between said capacitor and said spark gap, a spark discharge repetition rate control oscillator, spark discharge duration control means connected to said oscillator, and means to close said first and second electronic switches in response to said oscillator and said duration control means, thereby controlling the duration and repetition rate of discharge of said capacitor through said spark gap.

7. Spark discharge control apparatus comprising a capacitor, means for charging said capacitor, a spark gap, a first normally open unidirectional electronic switch conducting in a first direction and a second normally open unidirectional electronic switch conducting in a second direction in circuit between said capacitor and said spark gap, a spark discharge repetition rate control oscillator, spark discharge duration control means connected to said oscillator, and means to close said first and second electronic switches in response to said oscillator and said duration control means, thereby controlling the duration and repetition rate of discharge of said capacitor through said spark gap, and means for connecting a reactance in circuit with said spark gap for controlling the wave envelope of said spark discharge.

8. Spark discharge control apparatus comprising a capacitor, means for charging said capacitor, a spark gap, a first normally open unidirectional electronic switch conducting in a first direction and a second normally open unidirectional electronic switch conducting in a second direction in circuit between said capacitor and said spark gap, a first spark discharge repetition rate control oscillator, first spark discharge duration control means connected to said first oscillator, and first means to close said first electronic switch in response to said first oscillator and said first duration control means, a second spark discharge repetition rate control oscillator, second spark discharge duration control means connected to said second oscillator, and second means to close said second electronic switch in response to said second oscillator and said second duration control means.

9. Spark discharge control apparatus comprising a capacitor, means for charging said capacitor, a spark gap, a first normally open unidirectional electronic switch conducting in a first direction and a second normally open unidirectional electronic switch conducting in a second direction in circuit between said capacitor and said spark gap, a first spark discharge repetition rate control oscillator, first spark discharge duration control means connected to said first oscillator, and first means to close said first electronic switch in response to said first oscillator and said first duration control means, a second spark discharge repetition rate control oscillator, second spark discharge duration control means connected to said second oscillator, and second means to close said second electronic switch in response to said second oscillator and said second duration control means, and means for connecting a reactance in circuit with said spark gap.

10. Spark discharge control apparatus comprising a capacitor, means for charging said capacitor, a spark gap, a normally nonconducting ignitron electronic switch connected between said capacitor and said spark gap, a discharge repetition rate control oscillator, a wave shaper connected to said oscillator, relaxation oscillator spark discharge duration control means connected to said wave shaper, and a thyratron connected to said relaxation oscillator and said ignitron to fire said ignitron in response to said relaxation oscillator.

11. Spark discharge control apparatus comprising a capacitor, means for charging said capacitor, a spark gap, a first normally open ignitron unidirectional electronic switch conducting in a first direction, and a second normally open unidirectional ignitron electronic switch conducting in a second direction in circuit between said capacitor and said spark gap, a discharge repetition rate control oscillator, a wave shaper connected to said oscillator, a relaxation oscillator spark discharge duration control connected to said wave shaper, and first and second thyratrons connected to said relaxation oscillator to close said first and second ignitron electronic switches in response to said relaxation oscillator.

12. Spark discharge control apparatus comprising a capacitor, means for charging said capacitor, a spark gap, a first normally open ignitron unidirectional electronic switch conducting in a first direction, and a second normally open ignitron unidirectional electronic switch means conducting in a second direction in circuit between said capacitor and said spark gap, a discharge repetition rate control oscillator, a wave shaper connected to said oscillator, a relaxation oscillator spark discharge duration control connected to said wave shaper, and first and second thyratrons connected to said relaxation oscillator to close said first and second ignitron electronic switches in response to said relaxation oscillator, and means for connecting a reactance in circuit between said first and second ignitrons and said spark gap.

13. Spark discharge control apparatus comprising a capacitor, means for charging said capacitor, a spark gap, a first normally open ignitron unidirectional electronic switch conducting in a first direction and a second normally open ignitron electronic switch conducting in a second direction in circuit between said capacitor and said spark gap, a first spark discharge repetition rate control oscillator, first relaxation oscillator spark discharge duration control means connected to said first repetition rate control oscillator, and a first thyratron to close said first ignitron electronic switch in response to said first repetition rate control oscillator and said first relaxation oscillator duration control means, a second spark discharge repetition rate control oscillator, second relaxation oscillator spark discharge duration control means connected to said second repetition rate control oscillator, and a second thyratron to close said second ignitron electronic switch in response to said second repetition rate control oscillator and said second relaxation oscillator duration control means.

14. Spark discharge control apparatus comprising a capacitor, means for charging said capacitor, a spark gap, a first normally open ignitron unidirectional electronic switch conducting in a first direction and a second normally open ignitron unidirectional electronic switch conducting in a second direction in circuit between said capacitor and said spark gap, a first spark discharge repetition rate control oscillator, first relaxation oscillator spark discharge duration control means connected to said first repetition rate control oscillator, and a first thyratron to close said first ignitron electronic switch in response to said first repetition rate control oscillator and said first relaxation oscillator duration control means, a second spark discharge repetition rate control oscillator, second relaxation oscillator spark discharge duration control means connected to said second repetition rate control oscillator, and a second thyratron to close said second ignitron electronic switch in response to said second repetition rate control oscillator and said second relaxation oscillator duration control means, and a switch for connecting a reactance in circuit between said first and second ignitrons and said spark gap.

15. Spark discharge control apparatus comprising a capacitor, means for charging said capacitor, a spark gap, a first normally open unidirectional ignitron conducting in a first direction and a second normally open unidirectional ignitron conducting in a second direction in circuit between said capacitor and said spark gap, a first spark discharge repetition rate control oscillator, a first wave shaper connected to said first oscillator, a first multivibrator spark discharge duration control connected to said first wave shaper, and a first thyratron connected to said first multivibrator to close said first ignitron in response to said first oscillator and said first multivibrator duration control means, a second spark discharge repetition rate control oscillator, a second wave shaper connected to said second oscillator, a second multivibrator spark discharge duration control means connected to said second wave shaper, and a second thyratron to close said second ignitron in response to said second oscillator and said second multivibrator duration control means.

16. Spark discharge control apparatus comprising a capacitor, means for charging said capacitor, a spark gap, a first normally open unidirectional ignitron conducting in a first direction and a second normally open unidirectional ignitron conducting in a second direction in circuit between said capacitor and said spark gap, a first spark discharge repetition rate control oscillator, a first wave shaper connected to said first oscillator, a first multivibrator spark discharge duration control means connected to said first wave shaper, and a first thyratron connected to said first multivibrator to close said first multivibrator ignitron in response to said first oscillator and said first multivibrator duration control means, a second spark discharge repetition rate control oscillator, a second wave shaper connected to said second oscillator, a second multivibrator spark discharge duration control means connected to said second wave shaper, and a second thyratron to close said second ignitron in response to said second oscillator and said second multivibrator duration control means, and a switch for connecting a reactance in circuit between said first and second ignitrons and said spark gap.

References Cited in the file of this patent

UNITED STATES PATENTS

| | | |
|---|---|---|
| 2,449,661 | Hathaway | Sept. 21, 1948 |
| 2,478,904 | Edgerton | Aug. 16, 1949 |
| 2,478,907 | Edgerton | Aug. 16, 1949 |
| 2,700,120 | Germeshausen | Jan. 18, 1955 |
| 2,721,959 | Nessel | Oct. 25, 1955 |
| 2,991,421 | Volz | July 4, 1961 |